United States Patent
Chliwnyj et al.

(10) Patent No.: US 6,813,112 B2
(45) Date of Patent: Nov. 2, 2004

(54) METHOD, APPARATUS AND SOFTWARE FOR TAPE DRIVE MECHANICAL FAULT DETECTION

(75) Inventors: Alex Chliwnyj, Tucson, AZ (US); James Mitchell Karp, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 339 days.

(21) Appl. No.: 09/947,974

(22) Filed: Sep. 6, 2001

(65) Prior Publication Data

US 2003/0048568 A1 Mar. 13, 2003

(51) Int. Cl.[7] .................. G11B 5/584; G11B 17/00
(52) U.S. Cl. .................. 360/77.12; 360/69; 360/75
(58) Field of Search .................. 360/77.12, 78.02, 360/106, 109, 69, 75, 76, 77.01, 78.01

(56) References Cited

U.S. PATENT DOCUMENTS

| | | | |
|---|---|---|---|
| 3,707,707 A | | 12/1972 | Spencer et al. |
| 3,783,200 A | | 1/1974 | Jantzen et al. |
| 3,797,776 A | | 3/1974 | Umeda et al. |
| 4,991,039 A | | 2/1991 | Kaku |
| 5,377,052 A | * | 12/1994 | Guzman et al. .......... 360/261.1 |
| 5,508,865 A | * | 4/1996 | La Garcia et al. .......... 360/291 |
| 5,574,602 A | * | 11/1996 | Baca et al. .............. 360/77.12 |
| 5,629,813 A | | 5/1997 | Baca et al. |
| 5,844,814 A | | 12/1998 | Chliwnyj et al. |
| 5,872,672 A | | 2/1999 | Chliwnyj et al. |
| 5,946,159 A | * | 8/1999 | Chliwnyj et al. ........ 360/77.12 |
| 5,999,359 A | | 12/1999 | Fasen |
| 6,067,211 A | | 5/2000 | Chliwnyj et al. |
| 6,067,212 A | | 5/2000 | Poorman |

FOREIGN PATENT DOCUMENTS

| | | |
|---|---|---|
| JP | 62-149062 | 7/1987 |
| JP | 11-053796 | 2/1999 |

* cited by examiner

*Primary Examiner*—David Hudspeth
*Assistant Examiner*—Jason Olson

(57) ABSTRACT

The invention provides a method, apparatus and software for detecting mechanical faults in tape drives. The invention is especially suited to detecting collisions against a read/write head in a tape drive that occurs during tape threading operation. According to embodiments of the invention the read/write head is located at a predetermined position with a predetermined effective holding force, and an independent position sensor that senses the position of the read/write head is used to detect collisions against the read/write head. According to embodiment of the invention the relative frequency with which mechanical faults are detected over the course of multiple tape threading operations is evaluated to determine if there is a mechanical fault in a particular tape drive.

34 Claims, 11 Drawing Sheets

METHOD, APPARATUS AND SOFTWARE FOR TAPE DRIVE MECHANICAL FAULT DETECTION

CROSS-REFERENCE TO RELATED APPLICATIONS

Not Applicable

FIELD OF THE INVENTION

This invention pertains to information storage technology. More particularly, this invention pertains to tape drives.

BACKGROUND OF THE INVENTION

The rapid technological developments in computer hardware, and communications, and the proliferation of computers, has led to ever increasing demands for data storage capacity. Presently, there are a variety of information storage technologies suited for different purposes. For example hard drives are the mediums of choice for long term storage of programs and files in personal computers, whereas optical discs that can be written to are coming to supplant 3.5" magnetic disks for temporary portable file storage.

For portable, high capacity, inexpensive storage, the medium of choice is, at present, magnetic tape. One type of magnetic tape system uses a tape cartridge that houses a single spool on which the magnetic tape is wound. In this single spool type cartridge, there is a lead block that is attached to a free end of the tape (i.e. the outer end). When the tape is fully contained within the cartridge, the lead block is located at an opening in the cartridge through which the tape is withdrawn in use. In order to thread the tape in a tape drive, the lead block is engaged by a pin of a tape threading mechanism that pulls the tape by the lead block through a tape pathway in the tape drive. An example of this type of system is the 3590 tape drive made by International Business Machines, the assignee of the present invention. As the lead block is pulled through the tape pathway, its orientation is in part determined by the tension of the tape to which it is attached. The tension in the tape can vary from one cartridge to another. The location of the lead block is determined by the threading mechanism. Friction in the tape threading mechanism, which varies appreciably from one unit to another due to manufacturing tolerances can effect the speed with which the lead block is pulled through the tape pathway. The speed effects the tension in the tape. If the tension is insufficient, the orientation of the lead block is liable to vary from the intended orientation. A read/write head is located along the tape pathway. Faults in the threading mechanism or insufficient tension in the tape due to the condition of the cartridge, can allow the lead block to assume an orientation in which it will interfere with, i.e. strike, the read/write head. Faults in the threading mechanism can also lead to the pin striking the read/write head.

Striking of the read/write head can damage it, however of greater concern, is the possibility that striking the read/write head will create a nick or burr in the read/write head that will damage any tape subsequently processed by the tape drive. A nick or burr in the read/write head has the potential to cause the destruction of large amounts of data.

What is needed is a system for detecting mechanical fault conditions in a tape drive.

What is needed is a system for detecting mechanical faults in a tape threading mechanism of a tape drive that cause tape lead blocks or parts of the mechanism to strike a read/write head in the tape drive.

SUMMARY OF THE INVENTION

The invention provides software and a method for operating a tape drive. In particular, the invention provides methods and software for detecting mechanical faults in a tape drive that includes a read/write head, an actuator for setting a position of the read/write head, and independent position sensor for sensing the position of the read/write head and a servo loop for driving the actuator based on an output of the independent position sensor. Broadly stated, the method comprising the steps of reading an output of the independent position sensor at at least one predetermined time in order to obtain at least on independent position reading and comparing the at least one independent position reading to at least one bound. If the position reading is found to have violated the bound once or found to violate the bound with a certain relative frequency a mechanical fault in the tape drive is inferred, and error message to that effect is output.

DETAILED DESCRIPTION OF THE PREFERRED EMBODIMENTS

Figure 1:
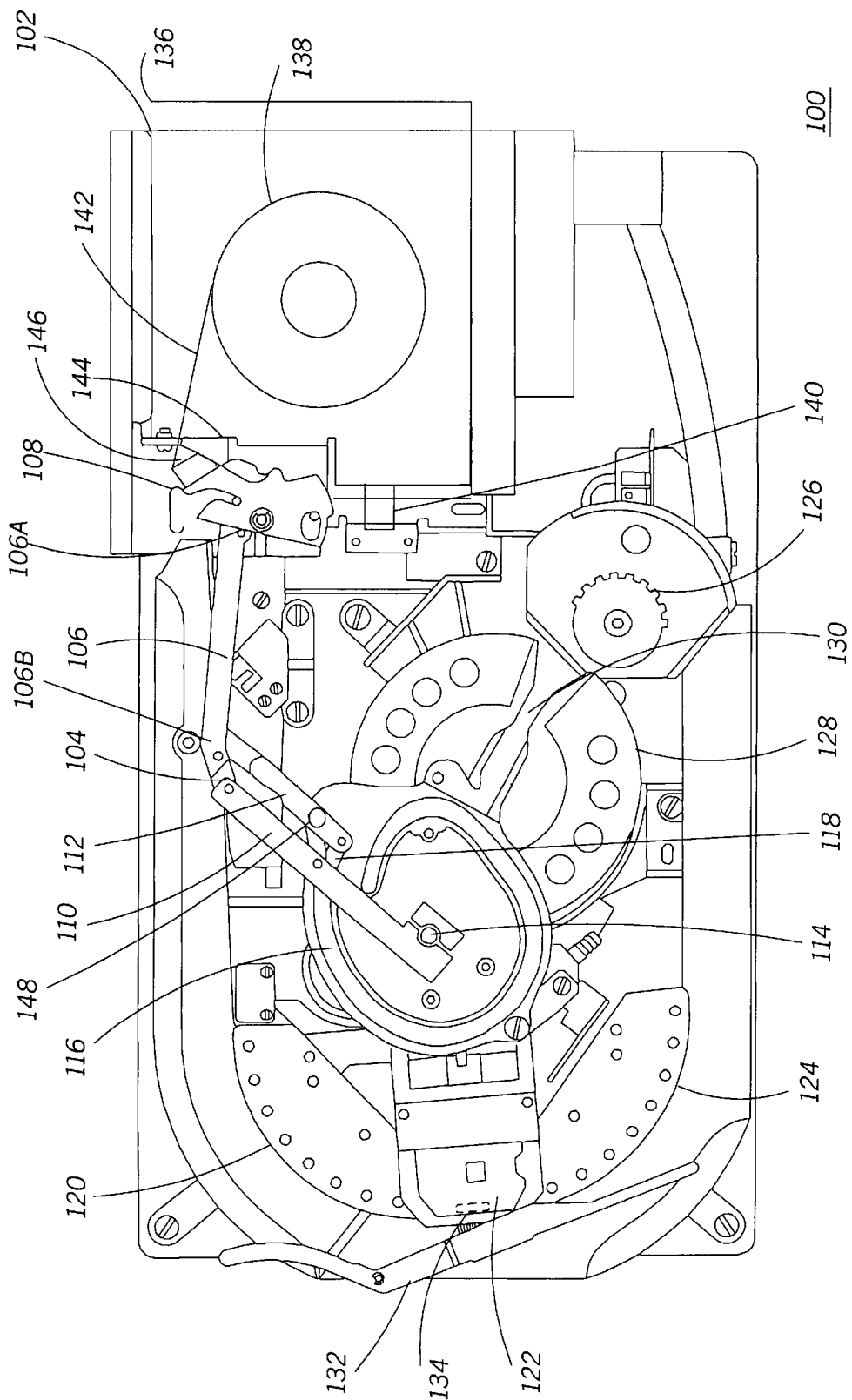
FIG. 1 is a plan view of a tape drive showing a tape threading mechanism in a first position according to a preferred embodiment of the invention.

FIG. 1 is a plan view of a tape drive 100 showing a tape threading mechanism in a first position. The tape drive 100 comprises a cartridge receptacle 102 into which a tape cartridge 136 to be read is inserted. A tape insertion sensor 140 for detecting the presence of the cartridge is located within the receptacle 102. The tape cartridge 136 includes a length of tape 142 wound on a single spool 138. A lead block 146 (FIG. 2) is attached to end of the length of tape 142 and is disposed at a front opening 144 of the tape cartridge.

The tape threading mechanism will presently be described. The tape drive 100 includes a threading arm 104.

The threading arm 104 includes a parallelogram arrangement of four links 106, 110, 112, 118. A fore link 106 comprises a pin 108 at its free end 106A. The pin 108 engages the lead block 146 in order to grasp a proximal end of the tape 142 contained in the cartridge 136. Opposite the free end 106A, near a second end 106B, the fore link 106 is coupled to a driven link 110, and a follower link 112. The driven link 110 is drivingly coupled to a rotating shaft 114. The rotating shaft is preferably the shaft of a thread mechanism drive motor 824 (FIG. 8) which drives the threading arm 104. A follower 146 affixed to the bottom of the follower link 112 moves in a cammed groove 116. The follower link 112 in addition to being coupled directly to the fore link 106 is also coupled to the driven link 110 through a connecting link 118. In operation, as the driven link 110 is rotated by the rotating shaft 114 the driven line 110 will pull the follower 146 (via the connecting link 118, fore link 106, and follower link 112) through the cammed groove 116. The cammed groove will force the follower, and follower link 112 to move radially with respect to the driven link 110 as the driven link 110 is rotated. The radially movement will cause the fore link 106 to rotate with respect to the respect the driven link 116. The cammed groove 116 is designed so that the rotation of the driven link 110 coupled with the rotation of the fore link 106 with respect to the driven link 106 will cause the pin 108 (that in operation will be engaged with the tape lead block 146) to move through a tape threading path of the tape drive 100.

The tape threading path passes, in order, a first tape guide 120, a head assembly 122, a second tape guide 124, and a tension transducer bearing 126. A motor driven take up spool 128 is located at the end of the tape threading path. The take up spool 128 includes a slot 130 for receiving and engaging the lead block 146. The lead block 146 will be moved into the slot 130 by the threading arm 104.

The tape drive 100 further comprises a cleaning brush 132 that is selectively engaged or disengaged with a read/write head 134 that is part of the head assembly 122. According to an alternative embodiment of the invention, a separate head for reading and/or a separate head for writing is used.

The tape 142 is an information storage medium and the tape drive 100 is a means for accessing the tape 142.

Figure 2:
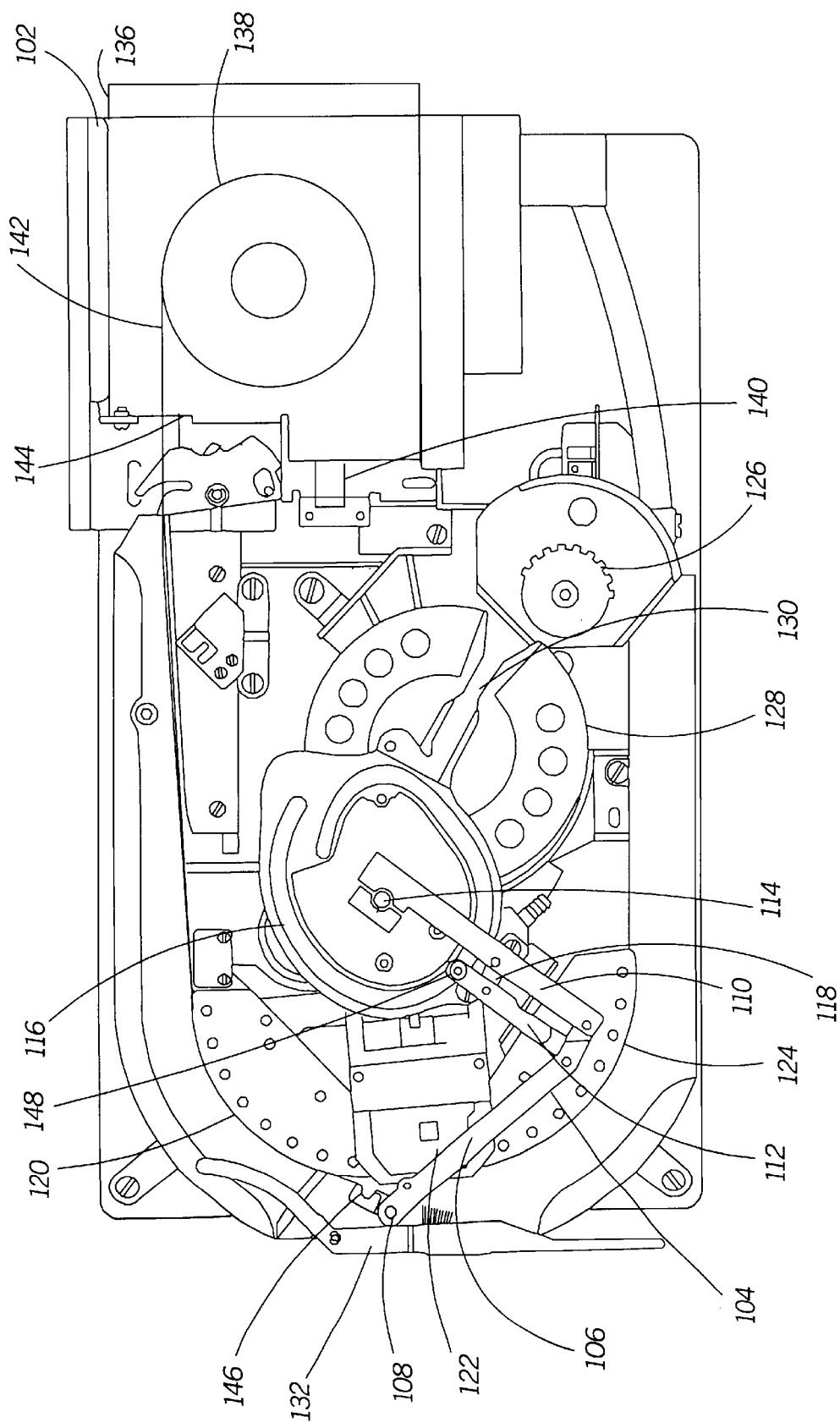
FIG. 2 is a plan view of the tape drive shown in FIG. 1 showing the tape threading mechanism in a second position.

FIG. 2 is a plan view of the tape drive shown in FIG. 1 showing the tape threading mechanism in a second position. As shown in FIG. 2, the lead block 146 which is engaged with the lead pin 108 is nearing the head assembly 122 and has pushed the cleaning brush 132 out of engagement with the read/write head 134. Note that the lead block 146 is rotatably engaged by the pin 108. Note also that the lead block 146 passes within a close distance of the read/write head 134.

Figure 3:
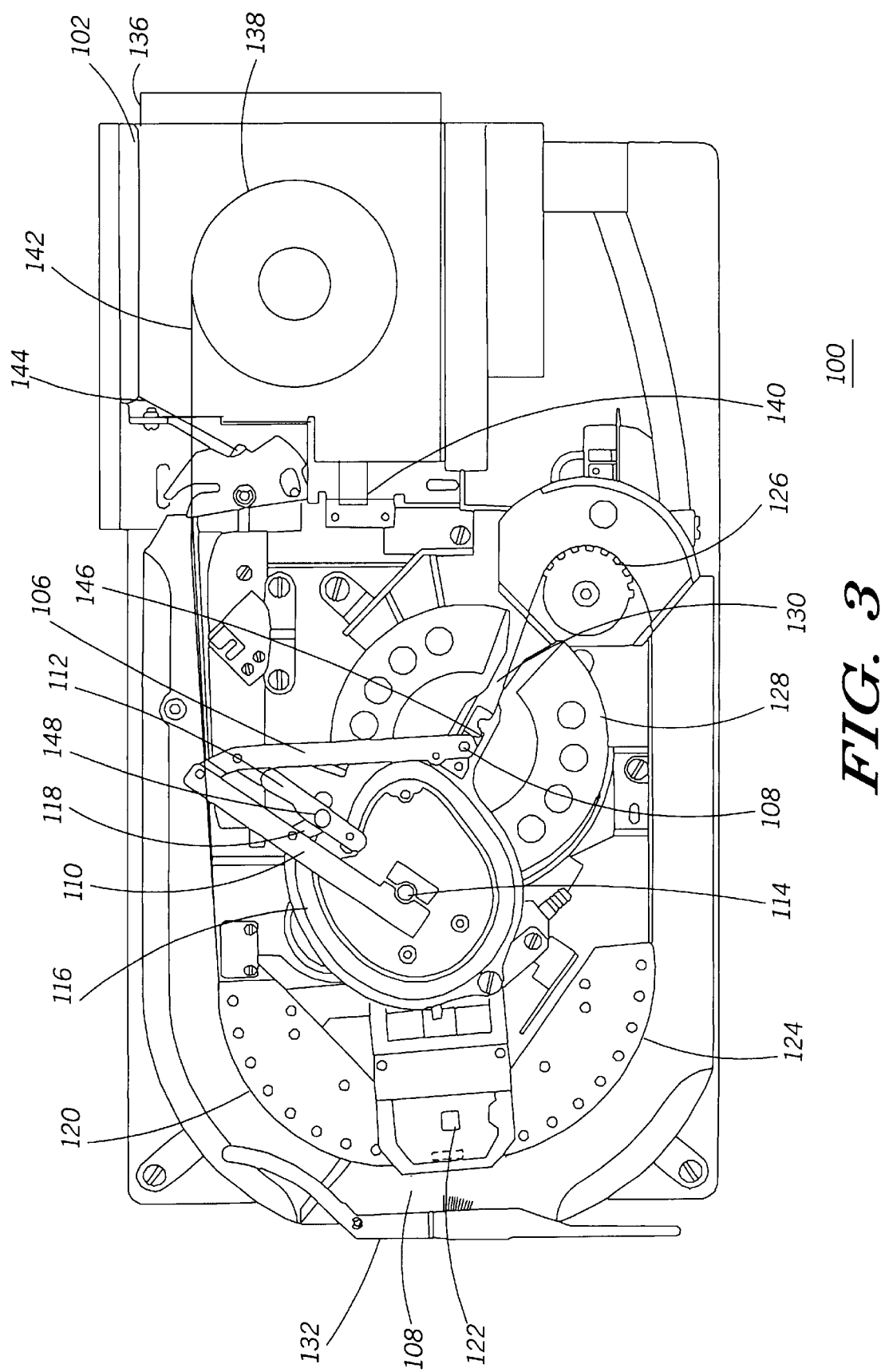
FIG. 3 is a plan view of the tape drive shown in FIG. 1 showing the tape threading mechanism in a third position.

FIG. 3 is a plan view of the tape drive shown in FIG. 1 showing the tape threading mechanism in a third position. As shown in FIG. 3, the lead block 146 has been engaged in the slot 130 in the take up spool 128.

The amount of friction in the tape threading mechanism, especially between the follower 146 and the grooved slot 116 is variable from one tape drive to another due to the complexity of the tape threading mechanism coupled with manufacturing tolerances, and wear in the mechanism. The variable friction leads to variations in the speed with which the lead block 146 is drawn through the tape threading path. Furthermore variations in the condition of tape cartridges 136 also leads to variations in the tension in a tape being withdrawn at a given speed. Under normal circumstances, the rotation of lead block 146 about the pin 108 will be constrained by tension in the tape 142. For certain combinations of tape tension and tape threading mechanism speed, a condition may arise in which the lead block 146 is free (not constrained by tape tension) to rotate. Under such circumstances, the lead block 108 may strike the read/write head 134 damaging it. More problematic than the damage to the read/write head 134 itself, is the possibility that a nick or burr raised on the read/write head 134 by a collision with the lead block 146 can damage tape subsequently processed by the tape drive 100. What is more, the damage to the read/write head 134 head could go undetected opening up the possibility of large scale data loss.

The present invention provides a system, method, and software for detecting collisions involving the head assembly read/write head 134. According to the present invention an independent position sensor 716 (FIG. 7) that senses the position of the read/write head 134 is used to detect a collision involving the read/write head 134. Furthermore a read/write head 134 positioning servo can be operated to hold the read/write head 134 in a position with a certain effective restoring force, and the output of the independent position sensor can be processed in such a manner (described below) to detect a collision involving the read/write head 134 or a pattern of collisions indicative of a mechanical fault in the tape drive 100. Mechanical faults that can be detected include faults in the tape threading mechanism.

Figure 4:
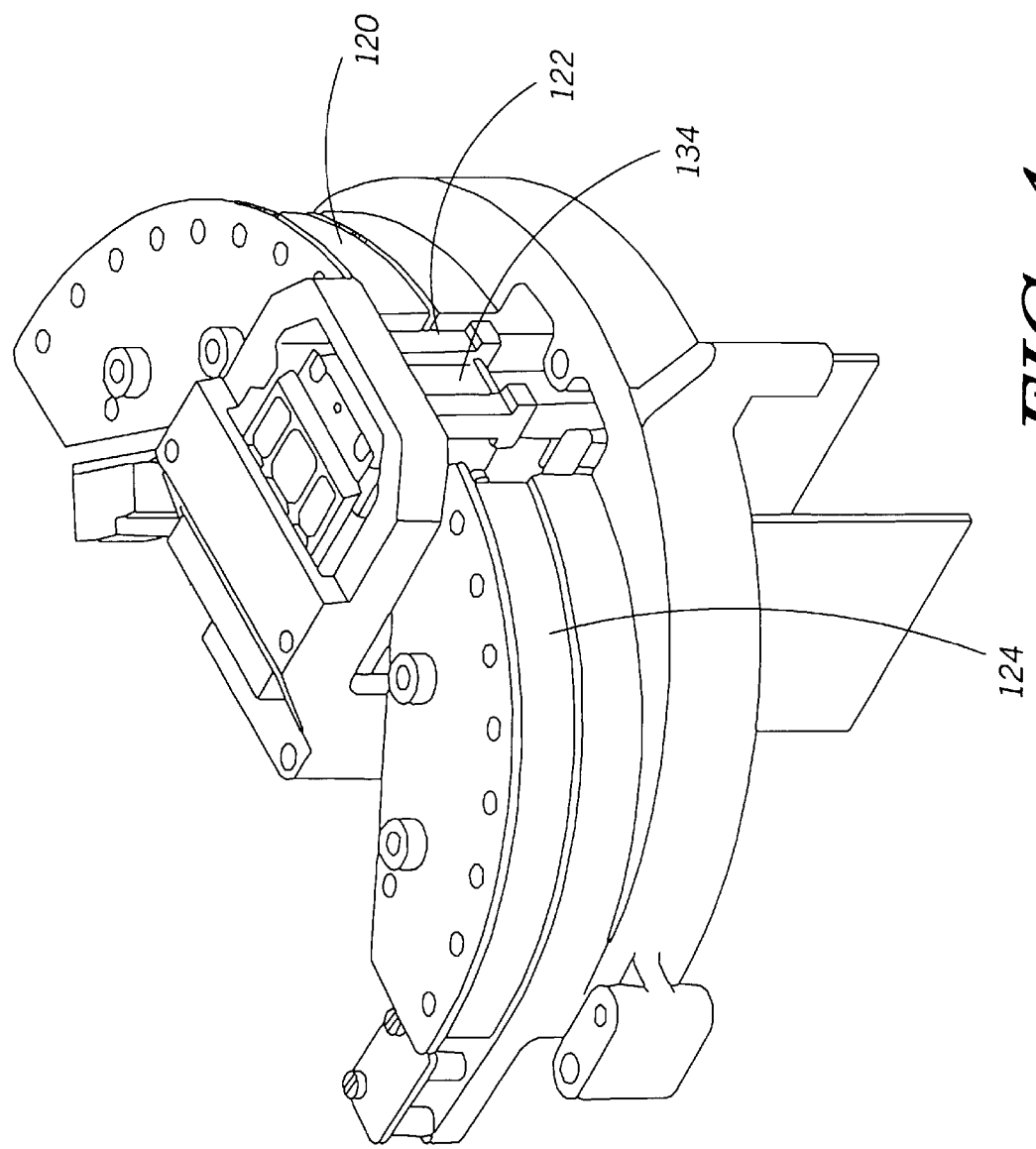
FIG. 4 is a perspective view showing parts of the tape drive shown in FIG. 1.

FIG. 4 is a perspective view showing parts of the tape drive 100 shown in FIG. 1. Referring to FIG. 4, the first tape guide 120 and second tape guide 124 are located on opposite sides of the head assembly 122. The head assembly 122 includes the read/write head 134 that preferably comprises a magnetoresistance device or giant magnetoresistance device.

Figure 5:
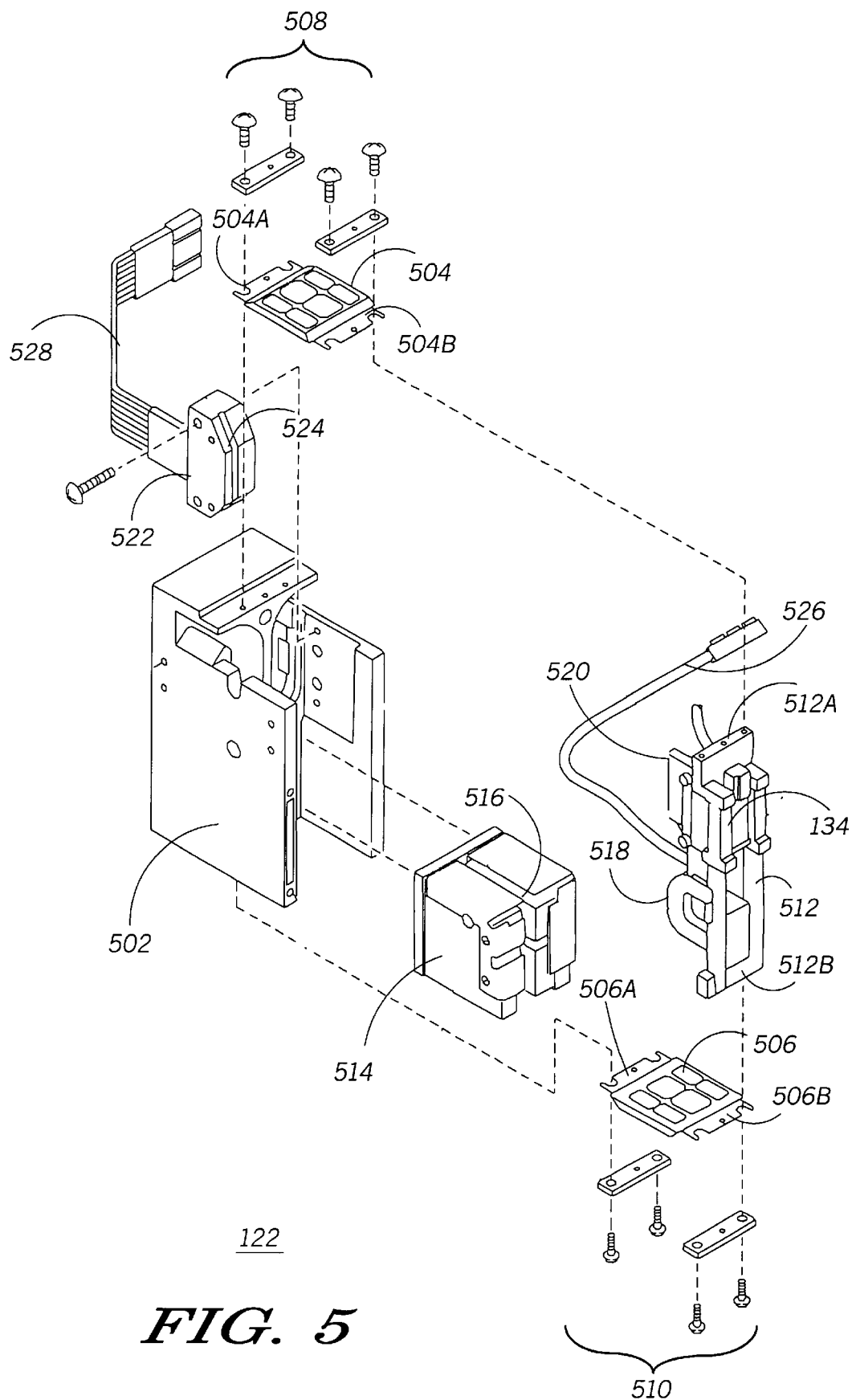
FIG. 5 is an exploded view of a head assembly of the tape drive shown in FIG. 1.

FIG. 5 is an exploded view of a head assembly 122 of the tape drive shown in FIG. 1. As shown in FIG. 5, the head assembly 122 comprises a head base 502, to which various components as will presently be described are attached. Back ends 504A, 506A of upper and lower leaf springs 504, 506 are secured to the head base 502. Front ends 504B, 506B of the upper and lower leaf springs 504, 506 are secured to upper and lower ends 512A, 512B respectively of a head support beam 512. Upper and lower sets of leaf spring securing hardware 508, 510 secure the upper and lower leaf springs 504, 506 to the head base 502 and the head support beam 512. The head support beam 512 is moveably supported by the upper and lower leaf springs 504, 506. The head support beam 512 can move up, or down against the restoring forces exerted by the leaf springs 504, 506.

A permanent magnet assembly 514 is mounted in the head base 502. The permanent magnet assembly 514 comprises four permanent magnets 602, 604, 606, 608 that are described in more detail below with reference to FIG. 6 and a magnetic assembly slot 516.

A flat solenoid coil 518 is mounted on the head support beam 512. In the assembled head assembly 122, the flat solenoid coil 518 is positioned in the magnetic assembly slot 516. The interaction of the solenoid 518 with the magnets in the permanent magnet assembly is described more detail below.

A optical source-detector assembly 522 is mounted to the head base 502. The optical source-detector assembly 522 comprises a source and a detector arranged on opposite sides of a grating accommodating slot 524. A diffraction grating 520 is mounted on the head support beam 512. In the assembled head assembly 122, the grating 520 is positioned within the grating accommodating slot 524 of the optical source-detector assembly 522. The grating 520, and the optical source-detector assembly 522 are used to measure the position of the head support beam 512, and the read/write head 134 supported thereon. The use of the grating 520, and the optical source-detector assembly 522 as an independent position sensor for sensing the position of a read/write head is taught in U.S. Pat. No. 5,844,814 which is assigned in common with the instant invention, and is hereby incorporated herein by reference. However, the present invention should not be construed as being limited to any particular type of independent position sensor. A ribbon cable 528 is provided for coupling to the optical source-detector assembly 522.

An electrical cable 526 is provided for coupling signals to and from the read/write head 134, and coupling a drive signal to the solenoid 518.

Figure 6:
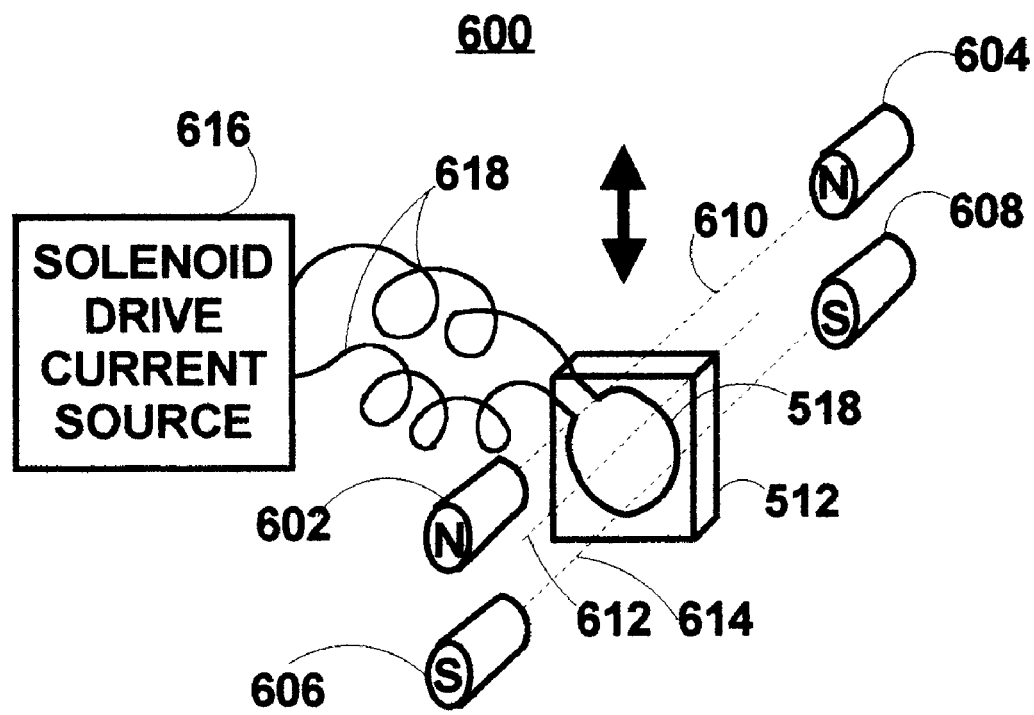
FIG. 6 is a schematic illustration of an actuator of the head assembly shown in FIG. 5.

FIG. 6 is a schematic illustration of an actuator 600 of the head assembly shown in FIG. 5. The actuator 600 comprises the solenoid 518, and a first 602, a second 604, a third 606, and a fourth 608 permanent magnet The four permanent magnets 602–608 are part of the permanent magnet assembly 514. The first 602 and second 604 permanent magnets are arranged on a first axis 610 on opposite sides of the solenoid 518. The poles of the first and second magnets face in the same direction. The third 606 and fourth 608 permanent magnets are arranged on a second axis 614 on opposite sides of the solenoid 518. The poles of the third 606 and fourth 608 permanent magnets are oriented opposite to the direction that the first 602 and second 604 permanent magnets face. The solenoid has a solenoid axis 612. When zero current is passing through the solenoid 518, the upper and lower leaf springs 504, 506 bias the solenoid 518 to a position such that, the solenoid axis 612 is below the first axis 610 and above the second axis 614. The solenoid 518 is coupled to a solenoid drive signal source 616 by conductors 618 that are part of the electrical cable 526. The drive signal source 616 preferably comprises an output of a servo loop (e.g., 730, FIG. 7) used to control the position of the read/write head 134 supported on the head support beam 512. By outputting opposite polarity signals from the drive current source 616, current can be made to pass in either direction through the solenoid 518. When the current is made to pass in a first direction through the solenoid 518, the solenoid 518 will tend to align with the first axis 612. On the other hand when current is made to pass second direction through the solenoid 518 the solenoid 518 will tend to align with the second axis 614. The vertical position of the solenoid 518, and the head support beam 512 on which it is mounted, and the read/write head 134 that is supported on the head support beam 512 is a function of the current passing through the solenoid 518. Thus the read/write head 134 can be located at a predetermined position by passing a predetermined current through the solenoid 518. As described in more detail below a servo loop 730 can be used to increase the accuracy and effect the biasing force with which the read/write head 134 is held in a predetermined position.

As illustrated, the north poles of the first and second permanent magnets 602, 604 face out of the plane of the paper and the south poles of the third and fourth permanent magnets face out of the plane of the paper.

The invention should not be construed as being limited to any particular type of actuator for positioning the read/write head 134.

Figure 7:
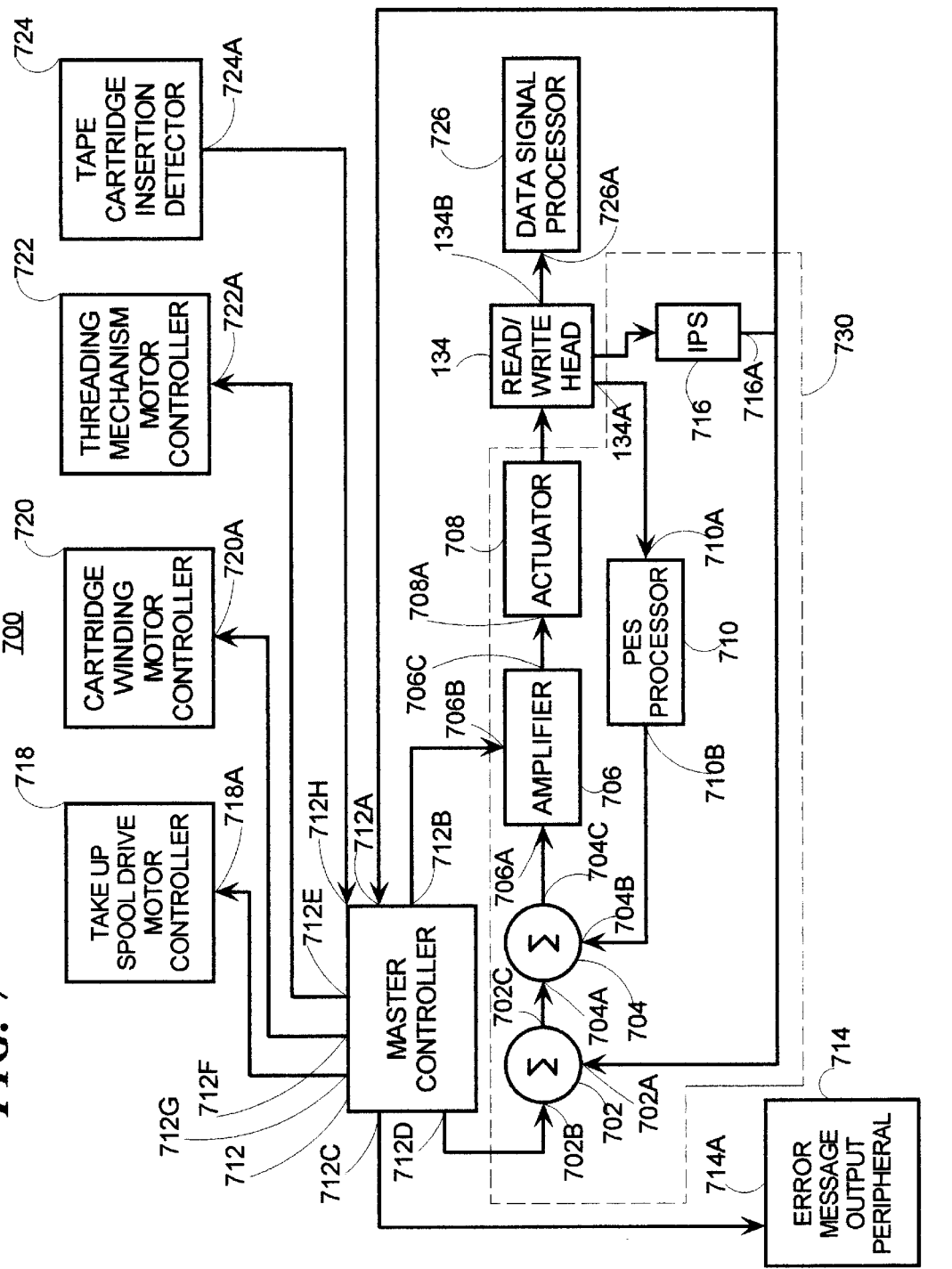
FIG. 7 is a functional block diagram of a system for detecting impacts against a read/write head according to a preferred embodiment of the invention according to a preferred embodiment of the invention.

FIG. 7 is a functional block diagram of a system 700 for detecting impacts against a read/write head according to a preferred embodiment of the invention. The system 700 includes elements that are part of a system for controlling the vertical position of read/write head 134 in order to maintain the alignment of the read/write head 134 with a track on a tape being written to, or read from. The position of the read/write head 134 is detected by an independent position sensor (IPS) 716. The independent position sensor 716 includes a position signal output 716A that is communicatively coupled to a position signal input 712A of a master controller 712, and to an inverting input 702A of a first summing junction 702. A commanded position signal output 712D of the master controller 712 is coupled to a non-inverting input 702B of the first summing junction 702. The summing junction takes the difference between the signals received at the inverting input 702A, and non-inverting input 702B and outputs a difference signal at a first summing junction output 702C. The first summing junction output 702C is communicatively coupled to a non-inverting input 704A of a second summing junction 704. The second summing junction 704 further comprises an inverting input 704B that is communicatively coupled to a processed signal output 710B of a position error signal (PES) processor 710. The position error signal processor 710 includes a raw PES input 710 that is coupled to at least one servo track signal output 134A of the read/write head 134. The PES processor 710 receives a raw PES from at least one servo track read element (not shown) of the read/write head 134 and outputs, at the processed PES output 710B, a processed PES that is indicative of the degree and direction of the misalignment between the read/write head 134 and a tape being processed. It is advantageous to practice the present invention during the threading and unthreading of the tape 142. While the tape 142 is being threaded, the position error signal processor 710 is inactive. The second summing junction 704 comprises a second summing junction output 704C that is communicatively coupled to an input 706A of an amplifier 706. An amplified signal output 706C of the amplifier 706 is communicatively coupled to an actuation signal input 708A of the actuator 708. The actuator 708 is mechanically coupled to the read/write head 134. The actuator 708 shown in FIG. 7 preferably takes the form of the actuator 600 shown in FIG. 6. The amplifier 706 further comprises a gain setting input 706B that is communicatively coupled to a gain setting output 712B of the master controller 412. The effect force with which the read/write head 134 is held in a position specified by the commanded position signal output 712D of the master controller 712, can be controlled by adjusting the gain setting of the amplifier 712.

The first summing junction 702, second summing junction 704, amplifier 706, actuator 708, and independent position sensor 716 are parts of a servo loop 730 used to control the position of the read/write head 134. The PES processor 710 is part of the servo loop 730 but is not active during tape threading.

The master controller 712 receives the signal output by the independent position sensor 716 as input and by executing algorithms that are described below in more detail with reference to flow charts shown in the FIGS., detects impacts against the read/write head 134 and/or determines if the severity and/or frequency of detected shocks is indicative of another tape drive fault conditions.

The master controller 712 includes an error signal output 712C communicatively coupled to a data input 714A of an error message output peripheral 714. The error message output peripheral 714 could for example comprise an liquid crystal display, memory, or a node (e.g., network interface card) of a communication network through which error messages are communicated.

In the event that the master controller determines a fault condition (e.g., an impact against the read/write head), it outputs an error signal through the error message output peripheral 714.

The read/write head 134 includes a data output 134B coupled to a data input 726A of a data signal processor 726. The data signal processor converts a raw data signal received from the read/write head 134 to binary data.

A take up spool drive motor controller 718 includes a take up motor command signal input 718A coupled to a take up motor command signal output 712G of the master controller 712.

A cartridge winding motor controller 720 includes a cartridge winding motor command input 720A coupled to a cartridge winding motor control output 712F of the master controller 712.

A threading mechanism motor controller 722 includes a threading mechanism control input 722A coupled to a threading mechanism control output 712E of the master controller 722.

A cassette insertion detector 724 includes a detection signal output 722A coupled to a detection signal input 712H of the master controller 712.

Figure 8:
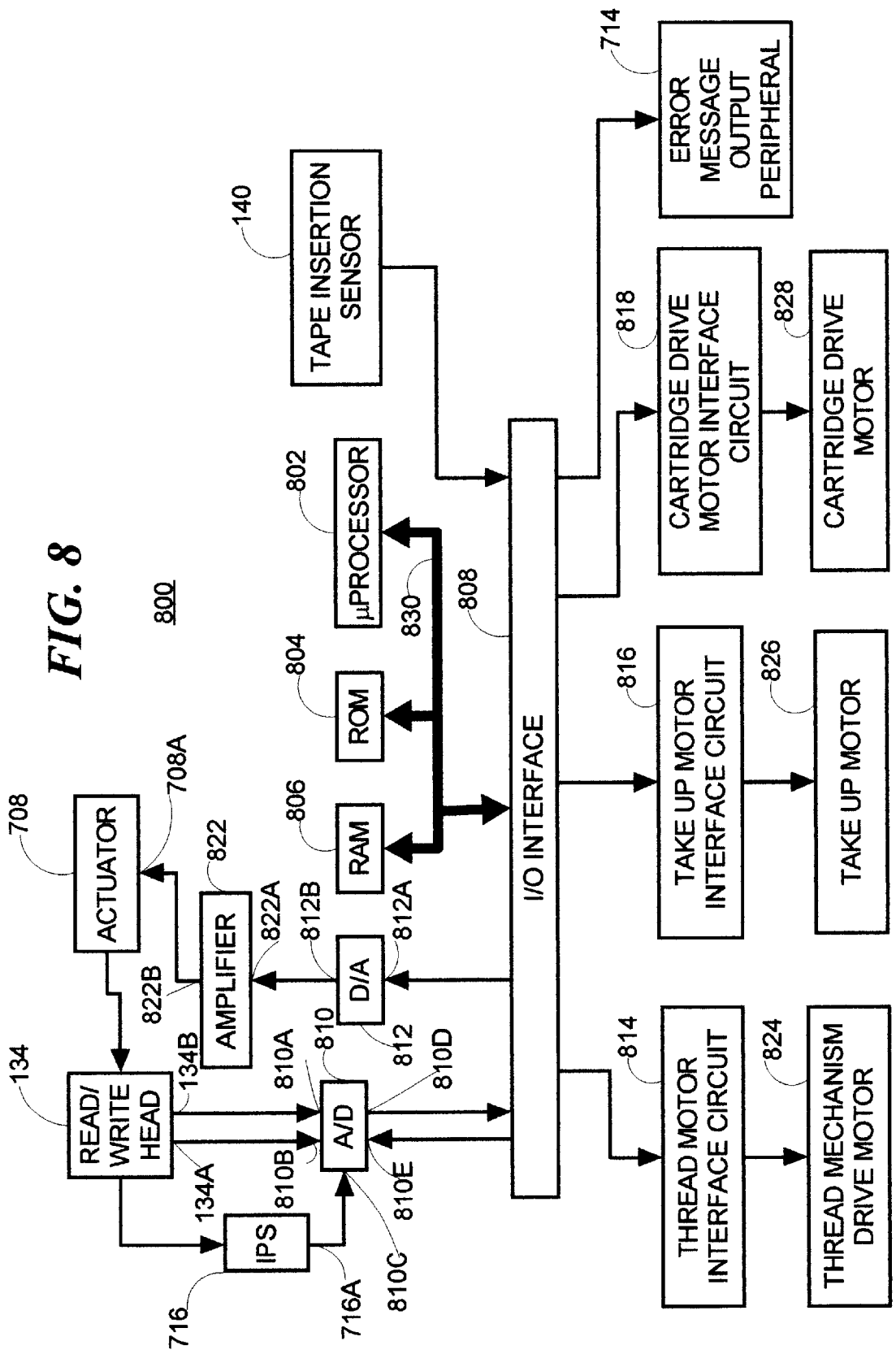
FIG. 8 is a hardware block diagram of the system shown in FIG. 4 according to a preferred embodiment of the invention.

FIG. 8 is a hardware block diagram 800 of the system shown in FIG. 7 according to a preferred embodiment of the invention. As shown in FIG. 8 hard, the system comprises a microprocessor 802 coupled through a digital signal bus 830 to a random access memory (RAM) 802, a read only memory (ROM) 804, and input/output (I/O) interface 808. The microprocessor 802 is used to execute programs that are described in more detail below with reference to flow diagrams shown in the FIGS. 9–10, for detecting mechanical faults including impacts against the read/write head 134 or making a determination that a fault condition characterized by a certain number, relative frequency or severity of impacts exists. The read only memory 804 is used to store the programs executed by the microprocessor 802. The read only memory 804 is a type of computer readable medium. Other types of computer readable media that can be used to store programs taught by the present invention are mentioned below. The random access memory 806 is used as a work space by the microprocessor 802.

The I/O interface 808 is used for outputting information to or receiving information from a number of peripheral devices as will presently be described. An analog-to-digital converter (A/D) 810, a digital-to-analog converter (D/A) 812, a thread motor interface circuit 814, a take-up motor interface circuit 816, a cartridge drive motor interface circuit 818, the tape insertion sensor 140, and the error message output peripheral 714 are coupled to the input/output interface 808.

The A/D 810 includes a first analog input 810A that is coupled to the servo track signal output 134A of the read/write head for receiving at least one raw PES signal. The first analog input can comprise more than one channel. The A/D 810 further comprises a second analog input 810B that is coupled to the data signal output 134B of the read/write head 134. The A/D 810 further comprises a third analog input 810C that is coupled to the position signal output 716A of the independent position sensor 716. If the optical independent position sensor taught in U.S. Pat. No. 5,844,814 is used, the third analog input 810C would preferably comprise two channels. Alternatively a multiplexer could be used. The analog-to-digital converter 810 further comprises a digital output 810 coupled to the I/O interface 808. The analog-to-digital converter further comprises a control input 810E coupled to the I/O interface 808. The control input 810E is used to coupled control signals that are used to select one of the analog inputs 810A–810C for processing by the A/D 810. The control input can comprise more than one signal line.

The D/A 812 includes a digital signal input 812A that is coupled to the I/O interface 808, and an analog signal output 812B that is coupled to an input 822A of a fixed gain amplifier 822. The fixed gain amplifier 822 further comprises an output 822B that is coupled to the actuation signal 708A of the actuator 708. According to the embodiment shown in FIG. 8, the amplifier 706 shown in FIG. 7 is embodied by a combination the fixed gain amplifier 822, the D/A 812, and a program run by the microprocessor 802.

The thread motor interface circuit 814 is drivingly coupled to a thread mechanism drive motor 824, allowing the thread mechanism drive motor 824 to be controlled by the microprocessor 802 in accordance with programs stored in the ROM 804. For use with the embodiment of the tape drive 100 shown in FIGS. 1–3 the thread mechanism drive motor is coupled to the rotating shaft 114.

The take-up motor interface circuit 816 is drivingly coupled to a take up motor 826. The take up motor is coupled to the take up spool 128. The cartridge drive motor interface circuit 818 is drivingly coupled to a cartridge drive motor 828. Upon insertion of cartridge 136, the cartridge drive motor is engaged with the spool 138 contained in the cartridge 136. The cartridge drive motor is used to apply a certain amount of reverse torque on the spool 138 during tape threading.

Certain functional blocks shown in FIG. 7 including the data signal processor 716, first summing junction 702, second summing junction 704, PES processor 710, and master controller 712 are according to a preferred embodiment of the invention implemented as programs stored in ROM 804 and executed by the microprocessor 802.

The thread mechanism motor control 722 is preferably embodied by the thread motor interface circuit 814, in combination with a program stored in the ROM 804 and executed by the processor 802. The take up spool drive motor controller 718 is preferably embodied by the take up motor interface circuit 816 in combination with a program stored in the ROM 804 and executed by the processor 802. The cartridge winding motor control 720 is preferably embodied by the cartridge winding motor interface circuit 818 in combination with a program stored in the ROM 804 and executed by the processor 802.

Figure 9:
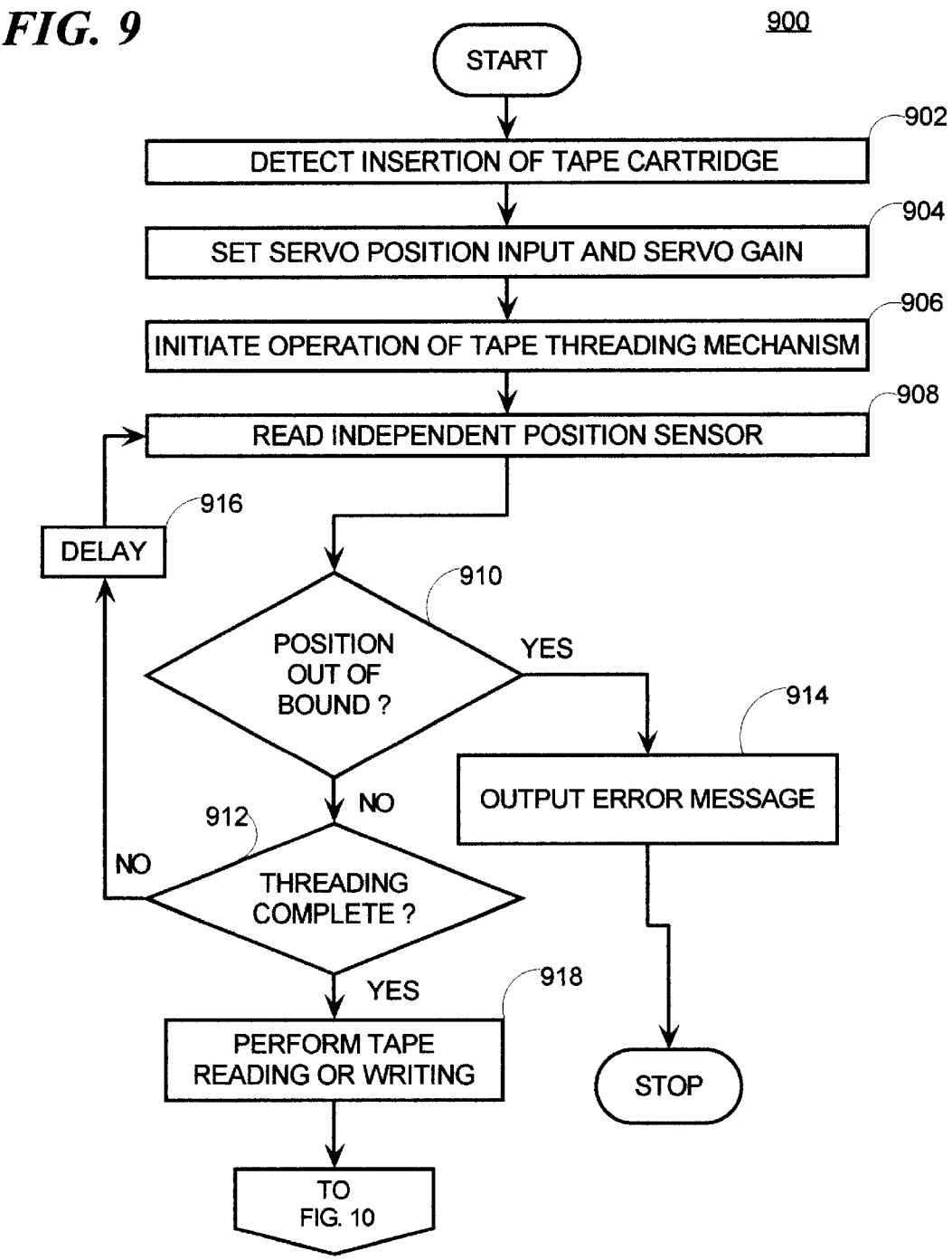
FIG. 9 is a first part of a flow chart of a program for detecting mechanical faults in tape drives according to an embodiment of invention.
Figure 10:
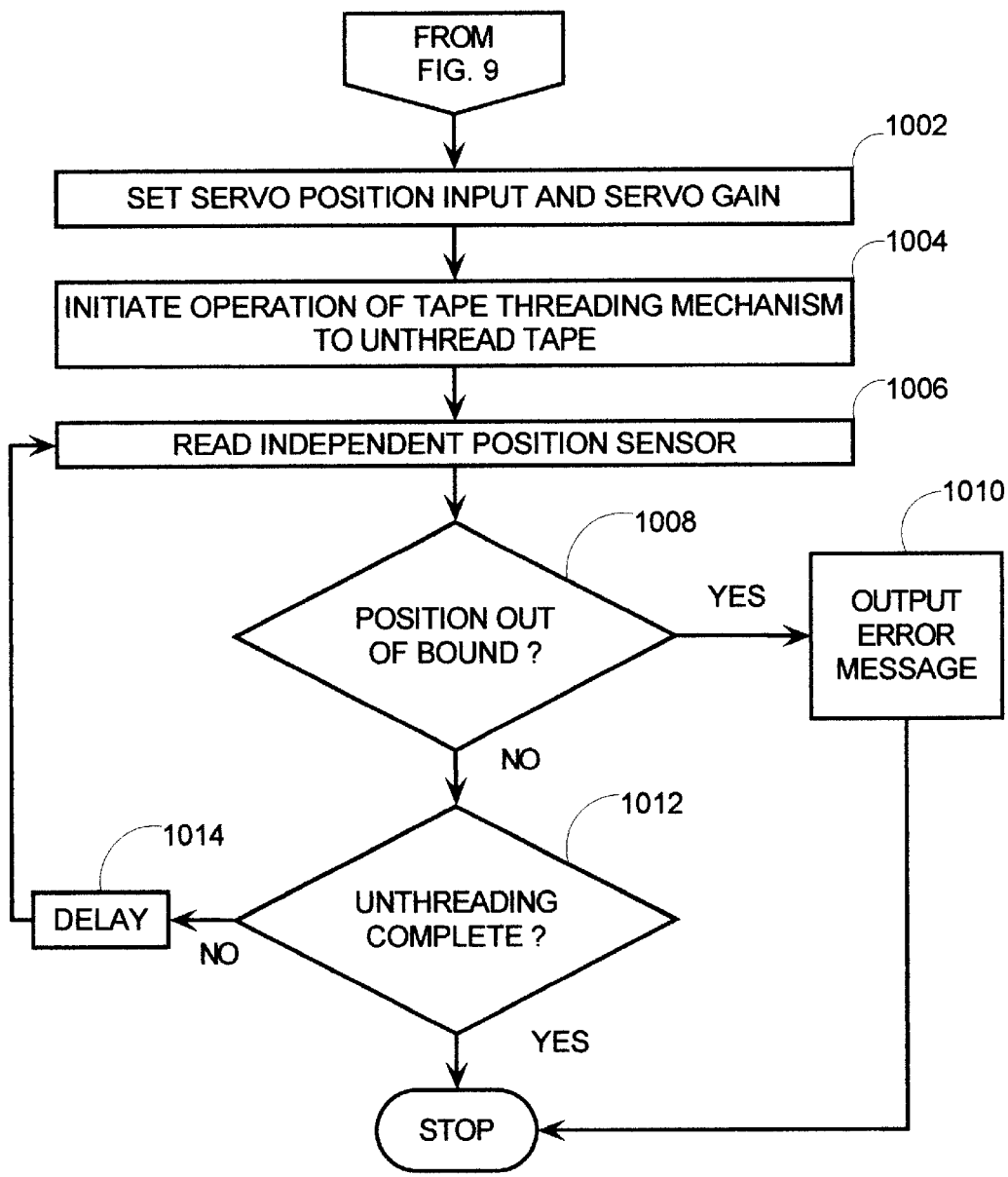
FIG. 10 is a second part of the flow chart begun in FIG. 9.

FIG. 9 is a first part of a flow chart of a program 900 for detecting mechanical faults in tape drives according to an embodiment of invention. FIG. 10 is a second part of the flow chart of program 900. The program 900 is preferably stored in ROM 804, and executed by processor 802. In step 902 insertion of a tape cartridge 136 is detected, preferably using tape insertion sensor 140. The insertion of the tape preferably triggers an interrupt that the microprocessor responds to by executing program 900. In step 904 a position input signal of a servo loop for controlling the position, e.g., a signal output at the commanded position signal output 712D, and servo loop gain, e.g., a signal output at gain setting output 712B of the master controller 712 are set to predetermined values in order to hold the read/write head 134 at a predetermined position with a predetermined effective force.

In step 906 operation of the tape threading mechanism is initiated. In the embodiment of the tape drive shown in FIGS. 1–3,8 this is done by operating the thread mechanism drive motor 824.

Program block 908 is the start of a loop in which the independent position sensor 716 is read at a sequence of times and its output compared to one or more bounds. In step 908 the independent position sensor 716 is read to obtain an independent position reading.

In step 910 the position of the read/write head 134 as measured by the independent position sensor 716 is checked against one or more bounds. The one or more bounds preferably include a lower bound and an upper bound. The lower and upper bounds are more preferably symmetrically placed with respect to the commanded position at which the read/write head 134 is located. In the latter case, the bound condition can be expressed as:

$$|X-Xo| \leq \Delta X, \qquad \text{Equation 1:}$$

where:

X is the position of the read/write head 134 read by the independent position sensor 134;

Xo is the commanded position at which the read/write head is set step 904; and ΔX is a bound on the deviation between the position at which the read/write head is set by the commanded position signal output, and the actual position measured by the independent position sensor 716. Note that the absolute value of the difference between X and ΔX is taken in equation 1.

According to alternative embodiment of the invention, the upper and lower bounds are not symmetrically placed with respect to the commanded position. In the latter case the bound condition can be expressed as:

$$X_L \leq X \leq X_u, \qquad \text{Equation 2:}$$

where:

X is, as before, the position of the read/write head 134 read by the independent position sensor 134;

$X_L$ is the lower bound on the position of the read/write head 134;

$X_U$ is the upper bound on the position of the read/write head 134.

By using the servo loop 730 to locate the read/write head 134 at a predetermined position that is maintained with a predetermined effective force (controlled at least in part by a servo loop gain setting), and comparing the actual position read by the independent position sensor 716 to one or more bounds, mechanical faults of tape drive 100 that produce shocks or vibrations can be sensed. Mechanical faults that can be sensed by the aforementioned method include mechanical faults that results in collisions of parts of the tape drive (e.g., pin 108) or parts of the tape cartridge 136 (e.g., lead block) 146 against the read/write head 134. As mentioned above in the background section, such collisions can be caused by a variety of conditions in the tape drive 100. The sensitivity with which mechanical faults that produce shocks or vibrations are detected can be adjusted by changing the bounds to which the position of the read/write head 134 is compared or by changing the effective force (by changing the gain setting of the servo loop 730) with which the read/write head is maintained in position. By either shifting the position bounds closer to the commanded position of the read/write head, or reducing the effective force the sensitivity can be increased. The sensitivity should not be made so high that vibrations or shocks that occur during normal functioning of the tape drive are interpreted as errors.

If it is determined in step 910, that the position of the read/write head 134 as read with the independent position sensor 716 violates the one or more bounds, then the program 900 jumps to step 914 in which an error message is output. As shown, the program 900 terminates after executing step 914.

If, on the other hand, it is determined that the position of the read/write head 134 is within bounds then the program 910 proceeds from step 910 to step 912. In step 912 it is determined if the tape threading operation initiated in process block 906 has been completed. If it is determined that the tape threading operation is not complete, then the program 900, loops back through a delay of a predetermined period 916 to step 908.

If on the other hand it is determined that the tape threading operation is complete, then in process block then in process block 918 the tape 142 is written to or read from.

Referring to FIG. 10 a continuation of the program 900 is shown. In step 1002 similarly to step 904 described above the position input, and servo loop gain are set to predetermined values in order to hold the read/write head 134 at a predetermined position with a predetermined force. In step 1004 operation of the tape threading mechanism is initiated in order to unthread the tape 142.

Program block 1006 is the start of a loop in which the independent position sensor 716 is read at a sequence of times and its output compared to one or more bounds. In program block 1006 the independent position sensor 716 is read to obtain an independent position reading.

In step 1008 as in step 910 described above, the position of the read/write head 134 as measured by the independent position sensor 716 is compared to one or more bounds. If step 1008 the position of the read/write head 134 is found to have violated the one or more bounds then in step 1010 an error message is output. The error message output in steps 914 and step 1010 are preferably output through the error message output 714. The error messages can, for example be output to a computer readable medium, message display device, or to a remote computer through a computer network.

In on the other hand, it is determined in step 1008 that the one or more bounds were not violated, then the program continues with step 1012. Instep 1012 it is determined if the tape unthreading operation initiated in step 1004 is complete. If the tape unthreading operation is not complete, then the program 900 loops back through a delay block 1014 to step 1006. If on the other hand the unthreading operation is complete, the program 900 terminates.

According to an alternative embodiment of the invention, the tape reading or writing is performed irrespective of whether mechanical faults are detected in the tape drive 100.

According to an alternative embodiment of the invention, rather than maintaining the read/write head 134 in a predetermined position, the read/write head is moved in a predetermined way while its actual position is compared to a current commanded position to sense mechanical faults in the tape drive 100.

Figure 11:
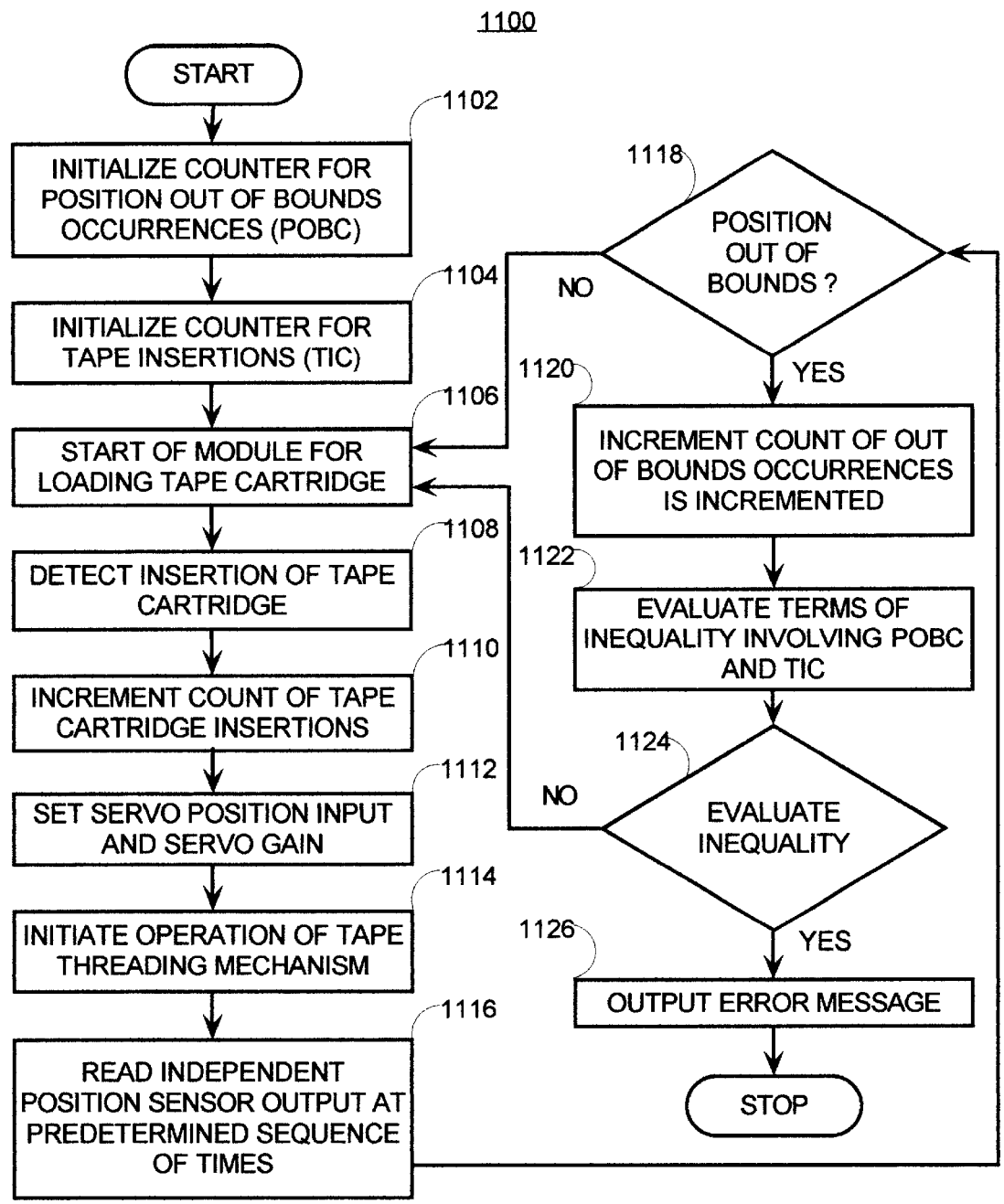
FIG. 11 is a flow chart of a program for detecting mechanical faults in tape drives according to a preferred embodiment of the invention.

FIG. 11 is a flow chart of a program 1100 for detecting mechanical faults in tape drives according to a preferred embodiment of the invention. The program 1100 is preferably stored in ROM 804, and executed by processor 802. In step 1102 a counter of out of bounds occurrences is initialized, e.g., set to zero.

In step 1104 a counter of tape insertions is initialized, e.g., set to zero.

Step 1106 begins a program module for loading tape cartridges.

In step 1108 insertion of a tape cartridge is detected, e.g., by the tape insertion sensor 140 and in step 1110 the count of tape insertions is incremented.

In step 1112 the servo 730 commanded position input and servo gain are set to predetermined values as discussed in connection with step 906 above.

In step 1114 operation of the tape threading mechanism is initiated.

In program block 1116 the independent position sensor 716 is checked continuously or at a predetermined sequence of times to obtain independent position readings. Program block 1116 is carried out during tape threading and/or tape unthreading periods. Step 1118 is a decision block the outcome of which depends on whether the position of the read/write head 134 violated one or bounds when checked in step 1116. The description of the one or more bounds given above in reference to FIG. 9 applies to step 1118 as well. If it is determined in step 1118 that the one or more bounds were not violated then the program 1100 loops back to process block 1106. If, on the other hand, it is determined in step 1118 that the one or more bounds were violated then the program 1100 continues with step 1120 in which the count of out of bounds occurrences is incremented. Continuing with the description of the branch of the program 1100 started in step 1120, in step 1122 terms of an inequality relation involving the position out of bounds count to the tape insertion count are evaluated. In step 1124 the boolean value (TRUE or FALSE) of the inequality relation is evaluated. According to a preferred embodiment the inequality relation tested in step 1124 is expressed as:

$$\text{INEQUALITY 1:} \quad \frac{POBC}{TIC + CO} \geq THRESH$$

where POBC is the position out of bound count that is initialized in step 1102 and incremented in step 1120;

TIC is the tape insertion count that is initialized in step 1104 and incremented in step 1110;

CO is a first predetermined constant; and

THRESH is a predetermined threshold constant that is less than unity.

As shown, inequality 1 uses a greater than sign as opposed to a less than sign. Thus, a high number of the position out of bound count, relative to the tape insertion count will result in a TRUE Boolean value of the inequality. CO is preferably greater than unity. The purpose of including CO in inequality 1 is to avoid triggering an error message if the tape drive 100 is functioning properly but a spurious event (e.g., a shock originating outside the tape drive 100) leads to a violation of the one or more bounds while threading the first tape after the tape insertion counter is initialized.

According to alternative embodiments of the invention different inequalities involving the position out of bound count, the tape insertion count and at least one predetermined constant are evaluated, e.g., in step 1124.

If the outcome of step 1124 is FALSE then the program 1100 loops back to step 1106. If, on the other hand, the outcome of step 1124 is TRUE, then the program 1100 continues with step 1124 in which an error message is output.

The program 1100 shown in FIG. 11 has the advantage that an error condition in the tape drive 100 will only be determined if the number of violations of the one or more bounds on the read/write head 134 position is large relative to the number of tape insertions. Therefore spurious violations of the one or more bounds which could for example be caused by an inadvertent jarring of the tape drive 100 do not lead to a determination that there is a mechanical fault in the tape drive 100.

Parts of the present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

It should be understood that the embodiments presented are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

What is claimed is:

1. A method of detecting mechanical faults in a tape drive that includes a read/write head, an actuator for setting a position of the read/write head, an independent position sensor for sensing the position of the read/write head, and a servo loop for driving the actuator based on an output of the independent position sensor, the method comprising the steps of:

reading an output of the independent position sensor at at least one predetermined time in order to obtain at least on independent position reading;

comparing the at least one independent position reading to at least one bound; and counting a number of times the at least one independent position reading violates the at least one bound to obtain an out-of-bound count.

2. The method of detecting mechanical faults in a tape drive according to claim 1 wherein the step of comparing the at least one independent position reading to at least one bound comprises the sub-step of:

comparing the at least one independent position signal to two bounds.

3. The method of detecting mechanical faults in a tape drive according to claim 1 further comprising the step of:

prior to reading the output of the independent position sensor at at least one predetermined time, setting a servo loop gain to a predetermined value, whereby the read/write head is located with a predetermined effective force.

4. The method of detecting mechanical faults in a tape drive according to claim 3 further comprising the steps of:

detecting insertion of a tape into the tape drive, and in response to detecting insertion of the tape into the tape drive, performing the steps of:

setting the servo loop gain to the predetermined value;

reading the output of the independent position sensor; and comparing the at least one independent position reading to at least one bound.

5. The method of detecting mechanical faults in a tape drive according to claim 1 further comprising the step of:

in the case that the at least one independent position reading violates the at least one bound, outputting an error signal.

6. The method of detecting mechanical faults in a tape drive according to claim 1 further comprising the step of:

evaluating an inequality involving at least the out-of-bound count.

7. The method of detecting mechanical faults in a tape drive according to claim 6 further comprising the step of:

in response to a predetermined outcome of the step of evaluating the inequality, outputting an error signal.

8. The method of detecting mechanical faults in a tape drive according to claim 6 further comprising the step of:

counting a number of tape insertions into the tape drive to obtain an insertion count.

9. The method of detecting mechanical faults in a tape drive according to claim 8 wherein the step of evaluating the inequality involving at least the out-of-bound count comprises the sub-step of:

evaluating an inequality involving at least the out-of-bound count and the insertion count.

10. The method of detecting mechanical faults in a tape drive according to claim 9 further comprising the step of:

in response to a predetermined outcome of the step of evaluating the inequality, outputting an error signal.

11. The method of detecting mechanical faults in a tape drive according to claim 9 wherein the step of evaluating an inequality involving at least the out-of-bound count and the insertion count comprises the sub-step of:

evaluating an inequality involving at least the out-of-bound count, the insertion count, and a predetermined constant.

12. A tape drive comprising:

a read/write head;

an actuator coupled to the read/write head for setting a position of the read/write head;

an independent position sensor coupled to the read/write head for measuring the position of the read/write head;

a servo loop coupled to the independent position sensor and the actuator for driving the actuator based on the position of the read/write head;

a memory including a set of programming instructions for detecting mechanical faults in the tape drive, the set of programming instructions including programming instructions for:

reading the independent position sensor to obtain a position reading;

comparing the position reading to at least one bound;

outputting a predetermined signal if the position reading violates the at least one bound;

a processor coupled to the actuator, the independent position sensor and the memory for executing the set of programming instructions; and counting a number of times that the position signal violates the at least one bound to obtain an out-of-bound count.

13. The tape drive according to claim 12 wherein:

the actuator comprises:

at least one permanent magnet; and at least one solenoid.

14. The tape drive according to claim 12 wherein:

the independent position sensor comprises:

a grating mechanically coupled to the read/write head;

at least one optical detector; and one or more sources coupled through the grating to the at least one optical detector;

whereby movement of the read/write head moves the grating and causes a change in a signal from the at least one detector.

15. The tape drive according to claim 12 wherein:

the servo loop comprises:

a gain setting input coupled to the processor; and the set of programming instructions include programming instructions for:

setting a gain setting of the servo loop prior to reading the independent position sensor to obtain a position reading.

16. The tape drive according to claim 12 wherein:

the programming instructions for comparing the position reading to at least one bound includes programming instructions for:

comparing the position reading to two bounds.

17. The tape drive according to claim 12 further comprising:

a tape insertion detector coupled to the processor.

18. The tape drive according to claim 17 wherein the programming instructions further comprise programming instructions for:

counting a number of tape insertions to obtain an insertion count; and evaluating an inequality involving at least the insertion count and the out-of-bound count.

19. The tape drive according to claim 12 further comprising:

a tape threading mechanism that threads a tape past the read/write head.

20. The tape drive according to claim 19 wherein:

the tape threading mechanism comprises:

a pin for engaging a leader block of the tape.

21. The tape drive according to claim 20 wherein:
the tape threading mechanism comprises:
- a parallelogram arrangement of four links including:
  - fore link coupled to the pin;
  - a driven link connected to the fore link;
  - a follower link connected to the fore link; and
  - a connecting link connected to the driven link and the follower link;
- a cammed groove; and
- a follower coupled to the follower link and located in the cammed groove.

22. A computer readable medium containing programming instructions for detecting mechanical faults in a tape drive, the computer readable medium including programming instructions for:
- reading an output of an independent position sensor at at least one predetermined time in order to obtain at least on independent position reading;
- comparing the at least one independent position reading to at least one bound; and
- counting a number of times the at least one independent position signal violates the at least one bound to obtain an out-of-bound count.

23. The computer readable medium according to claim 22 wherein the programming instructions for comparing the at least one independent position reading to at least one bound comprises programming instructions for:
- comparing the at least one independent position signal to two bounds.

24. The computer readable medium according to claim 22 further comprising programming instructions for:
- prior to reading the output of the independent position sensor at at least one predetermined time, setting a servo loop gain to a predetermined value.

25. The computer readable medium according to claim 24 further comprising programming instructions for:
- detecting insertion of a tape into the tape drive, and in response to detecting insertion of the tape into the tape drive, performing the steps of:
  - setting the servo loop gain to the predetermined value;
  - reading the output of the independent position sensor; and
  - comparing the at least one independent position reading to the at least one bound.

26. The computer readable medium according to claim 22 further comprising programming instructions for:
- outputting an error signal in the case that the at least one independent position signal violates the at least one bound.

27. The computer readable medium according to claim 22 further comprising programming instructions for:
- evaluating an inequality involving at least the out-of-bound count.

28. The computer readable medium according to claim 27 further comprising programming instructions for:
- in response to a predetermined outcome of the step of evaluating the inequality, outputting an error signal.

29. The computer readable medium according to claim 27 further comprising programming instructions for:
- counting a number of tape insertions into the tape drive to obtain an insertion count.

30. The computer readable medium according to claim 29 wherein the programming instructions for evaluating the inequality involving at least the out-of-bound count comprise programming instructions for:
- evaluating an inequality involving at least the out-of-bound count and the insertion count.

31. The computer readable medium according to claim according to claim 30 further comprising programming instructions for:
- in response to a predetermined outcome of the step of evaluating the inequality, outputting an error signal.

32. The computer readable medium according to claim 30 wherein the programming instructions for evaluating an inequality involving at least the out-of-bound count and the insertion count comprise programming instructions for:
- evaluating an inequality involving at least the out-of-bound count, the insertion count, and a predetermined constant.

33. An apparatus for accessing an information storage medium, the apparatus comprising:
- a first means selected from the group consisting of a means for reading the information storage medium, a means for writing to the information storage medium, and a means for reading to and writing from the information storage medium;
- a means for positioning the first means;
- a means for sensing a position of the first means; and
- a means for determining if the position of the first means violates one or more bounds.

34. The apparatus according to claim 33 further comprising:
- a means for outputting an error signal if the means for determining, determines that the one or more bounds have been violated.

* * * * *

UNITED STATES PATENT AND TRADEMARK OFFICE
CERTIFICATE OF CORRECTION

PATENT NO.   : 6,813,112 B2
DATED        : November 2, 2004
INVENTOR(S)  : Chliwnyj et al.

It is certified that error appears in the above-identified patent and that said Letters Patent is hereby corrected as shown below:

Column 2,
Line 13, delete "comprising", and insert -- comprises --.
Line 15, delete "on", and insert -- one --.
Line 20, after the word "and", insert -- an --.
Line 40, delete "according to a pre-".
Line 41, delete "ferred embodiment of the invention".
Line 46, delete "an", and insert -- a --.
Line 47, before the word "embodiment", insert -- preferred --.
Line 47, before the word "invention", insert -- the --.

Column 4,
Line 5, delete "108", and insert -- 146 --.
Line 10, delete "What is more", and insert -- Moreover --.
Line 13, delete "present invention", and insert -- preferred embodiment --.
Line 15, delete "According to the present invention".
Line 16, delete "an", and insert -- An --.

Column 5,
Line 14, after the period "." add the following sentence -- An electrical cable 526 is provided for coupling signals to and from the read/write head 134, and coupling a drive signal to the solenoid 518. --.
Lines 15-17, delete all contents.
Line 62, after the period "." add the following sentence -- The invention should not be construed as being limited to any particular type of actuator for positioning the read/write head 134. --.
Lines 63-65, delete all contents.

Column 6,
Line 57, delete "the".
Line 57, after the word "FIGS.", insert -- 9-11 --.
Line 67, after the period ".", add the following sentence -- In the event that the master controller determines a fault condition (e.g., an impact against the read/write head), it outputs an error signal through the error message output peripheral 714. --.

UNITED STATES PATENT AND TRADEMARK OFFICE
CERTIFICATE OF CORRECTION

PATENT NO. : 6,813,112 B2
DATED : November 2, 2004
INVENTOR(S) : Chliwnyj et al.

It is certified that error appears in the above-identified patent and that said Letters Patent is hereby corrected as shown below:

Column 7,
Lines 1-3, delete all contents.
Line 8, after the period ".", add the following sentences -- A take up spool drive motor controller 718 includes a take up motor command signal input 718A coupled to a take up motor command signal output 712G of the master controller 712. A cartridge winding motor controller 720 includes a cartridge winding motor command input 720A coupled to a cartridge winding motor control output 712F of the master controller 712. A threading mechanism motor controller 722 includes a threading mechanism control input 722A coupled to a threading mechanism control output 712E of the master controller 722. A cassette insertion detector 724 includes a detection signal output 722A coupled to a detection signal input 712H of the master controller 712. --.
Lines 9-23, delete all contents.

Column 10,
Line 62, after the period ".", add the following sentences -- Step 1106 begins a program module for loading tape cartridges. In step 1108 insertion of a tape cartridge is detected, e.g., by the tape insertion sensor 140 and in step 1110 the count of tape insertions is incremented. In step 1112 the servo 730 commanded position input and servo gain are set to predetermined values as discussed in connection with step 906 above. In step 1114 operation of the tape threading mechanism is initiated. --.
Lines 63-67, delete all contents.

Column 11,
Lines 1-5, delete all contents.

Signed and Sealed this

Twenty-second Day of November, 2005

JON W. DUDAS
*Director of the United States Patent and Trademark Office*